(12) United States Patent
Kaneko et al.

(10) Patent No.: US 7,182,884 B2
(45) Date of Patent: Feb. 27, 2007

(54) BIO-LIQUID CRYSTAL POLYMER AND SHAPED MATERIAL USING SAME

(75) Inventors: Tatsuo Kaneko, Kagoshima (JP);
Michiya Matsusaki, Kagoshima (JP);
Tran Thi Hang, Kagoshima (JP);
Mitsuru Akashi, 22-25, sanchome,
Yamadamachinishi, Suita-shi, Osaka-fu,
565-0824 (JP); Naoto Kuriyama,
Nishikasugai-gun (JP)

(73) Assignees: Mitsuru Akashi, Osaka-fu (JP);
Toyoda Gosei Co., Ltd., Aichi-ken (JP)

( * ) Notice: Subject to any disclaimer, the term of this patent is extended or adjusted under 35 U.S.C. 154(b) by 191 days.

(21) Appl. No.: 10/627,995

(22) Filed: Jul. 28, 2003

(65) Prior Publication Data

US 2005/0018123 A1    Jan. 27, 2005

(30) Foreign Application Priority Data

Jan. 30, 2003    (JP)    ............................ 2003-022858

(51) Int. Cl.
*C09K 19/38* (2006.01)
*C09K 19/52* (2006.01)
*A61K 317/15* (2006.01)
*C08G 63/06* (2006.01)
*C08G 63/48* (2006.01)

(52) U.S. Cl. ............ 252/299.01; 514/53; 514/54; 514/57; 525/54.1; 525/54.11; 525/54.3; 527/200; 527/207; 527/300; 527/311; 527/315

(58) Field of Classification Search ........... 252/299.01; 514/53, 57, 54; 525/54.1, 54.11, 54.2, 54.3, 525/54.33; 527/200, 207, 300, 311, 315

See application file for complete search history.

(56) References Cited

U.S. PATENT DOCUMENTS

| 4,833,230 | A | * | 5/1989 | Kiely et al. | ................. | 528/230 |
| 5,932,539 | A | * | 8/1999 | Stupp et al. | ................... | 514/2 |
| 6,342,300 | B1 | * | 1/2002 | Bengs et al. | ........... | 428/402.21 |
| 6,537,575 | B1 | * | 3/2003 | Firestone et al. | ........... | 424/484 |
| 7,064,113 | B2 | * | 6/2006 | Maehara | ...................... | 514/52 |
| 2002/0130436 | A1 | * | 9/2002 | Maehara | ................. | 264/176.1 |

FOREIGN PATENT DOCUMENTS

| EP | 1241231 | * | 9/2002 |
| JP | 58-83080 | * | 5/1983 |
| WO | WO-97/48782 | * | 12/1997 |

OTHER PUBLICATIONS

Jin et al. "Synthesis, Characterization, and in Vitro Degradation of a Novel Thermotropic Ternary Copolyester Base on p-Hydroxybenzoic Acid, Glycolic Acid and p-Hydroxycinnamic Acid", arcomolecules vol. 28, No. 14, pp. 4785-4794, 1995.*
English abstract for JP 58-83080, 1983.*
Kaneko et al., "Thermotropic Liquid-Crystalline Polymer Derived from Natural Cinnamoyl Biomonomers", Marcomolecular Rapid Communications, vol. 25, pp. 673-677, 2004.*
Matsusaki et al., "Synthesis and characterization of Novel Biodegradable Polymers Composed of Hydroxycinnamic Acid and D,L-Lactic Acid", J. of Applied polymer Science, 82(10), Apr. 4, 2000, pp. 2357-2364.
Doi Yoshiharu, "Biodegradable Plastic Handbook", May 26, 1995, pp. 576-581.

* cited by examiner

*Primary Examiner*—Shean C. Wu
(74) *Attorney, Agent, or Firm*—Posz Law Group, PLC (57) ABSTRACT

A bio-liquid crystal polymer is made from a tissue-derived compound or the derivatives. The bio-liquid crystal polymer has a characteristic of liquid crystal under predetermined conditions and is biocompatible.

8 Claims, 8 Drawing Sheets

CRYSTAL (25°C)

FIG. 4B

LIQUID CRYSTAL (220°C)

BIO-LIQUID CRYSTAL POLYMER AND SHAPED MATERIAL USING SAME

The present application is based on Japanese patent application No. 2003-022858, the entire contents of which are incorporated herein by reference.

BACKGROUND OF THE INVENTION

1. Field of the Invention

This invention relates to an environmentally recycling-oriented bio-liquid crystal polymer made from a tissue-derived product or the derivatives and, particularly, to a bio-liquid crystal polymer available in wide fields such as medical apparatus, electronic and electrical parts and automobile parts.

2. Description of the Related Art

Conventional liquid crystal polymers are of lyotropic type to be processed while being dissolved by solvents and thermotropic type to be thermally processed. The lyotropic type includes aromatic polyamides and polyphenylenebisbenzothiazol, and the thermotropic type includes polyesters (aromatic diols, aromatic dicarboxylates, hydroxycarboxylates). The liquid crystal polymers have a high mechanical strength and, therefore, the polymers can be used for electronic and electrical parts.

However, the polymers belong to environmentally accumulated type that is difficult to decompose and, thus, is accumulated in the environment. Therefore, polymers that belong to environmentally recycling-oriented type are desired since they are easily decomposed to give only water and carbon dioxide and, thus, do not affect the environment.

Doi Yoshiharu, "Biodegradable Plastic Handbook", first edition, pages 576–581, NTS Co. Ltd., May 26, 1995 reports an example of the environmentally recycling-oriented polymer, polylactic acid. The polylactic acid is made from the starch of corns or potatoes. When disposed, it is subject to hydrolysis or biodegradation to give water and carbon dioxide. The polylactic acid can be used for agricultural film, disposal container and stationery.

However, the polylactic acid polymers has a thermal deformation temperature as low as about 60° C. and, therefore, it cannot be used for products requiring a high thermal resistance such as automobile parts.

SUMMARY OF THE INVENTION

It is an object of the invention to provide a bio-liquid crystal polymer that is environmentally recycling-oriented and available in wide fields such as medical apparatus, electronic and electrical parts and automobile parts.

According to a first aspect of the invention, a bio-liquid crystal polymer, comprises a tissue-derived compound or the derivatives, wherein:

the bio-liquid crystal polymer has a characteristic of liquid crystal under predetermined conditions and is biocompatible.

According to a second aspect of the invention, a bio-liquid crystal polymer, comprising polyhydroxycinnamic acid, wherein:

the bio-liquid crystal polymer is biocompatible.

According to a third aspect of the invention, a bio-liquid crystal polymer, comprising a copolymer which is synthesized by polymerizing two kinds of aromatic series natural products which have two or more reactive functional groups and are capable of polymerizing.

According to a fourth aspect of the invention, a bio-liquid crystal polymer, comprising a copolymer which is produced by polymerizing a) any one of aromatic series natural products which have two or more reactive functional groups and are capable of polymerizing and b) one or more selected from nucleic acids, amino acids, saccharides, fatty acids, terpenes, porphyrins, flavonoids, steroids and alkaloids which have two or more reactive functional groups and are capable of polymerizing.

According to a fifth aspect of the invention, a bio-liquid crystal polymer, comprising a copolymer which is produced by polymerizing two or more selected from nucleic acids, amino acids, saccharides, fatty acids, terpenes, porphyrins, flavonoids, steroids and alkaloids which have two or more reactive functional groups and are capable of polymerizing and have a rigid structural unit such as alicyclic, double bond and triple bond.

According to a sixth aspect of the invention, a bio-liquid crystal polymer, comprising a homopolymer which is produced by polymerizing an aromatic series natural product which has two or more reactive functional groups and are capable of polymerizing.

According to a seventh aspect of the invention, a bio-liquid crystal polymer, comprising a homopolymer which is produced by polymerizing one selected from nucleic acids, amino acids, saccharides, fatty acids, terpenes, porphyrins, flavonoids, steroids and alkaloids which have two or more reactive functional groups and are capable of polymerizing.

According to an eighth aspect of the invention, a bio-liquid crystal polymer, comprising a homopolymer which is produced by polymerizing one selected from nucleic acids, amino acids, saccharides, fatty acids, terpenes, porphyrins, flavonoids, steroids and alkaloids which have two or more reactive functional groups and are capable of polymerizing and have a rigid structural unit such as alicyclic, double bond and triple bond.

According to a ninth aspect of the invention, a bio-liquid crystal polymer, comprising a copolymer of hydroxycinnamic acid and lithocholic acid.

According to a tenth aspect of the invention, a shaped material for biocompatible parts, comprising a copolymer of hydroxycinnamic acid and lithocholic acid or polyhydroxycinnamic acid.

According to an eleventh aspect of the invention, a shaped material for parts requiring mechanical strength and thermal resistance, comprising a copolymer of hydroxycinnamic acid and lithocholic acid or polyhydroxycinnamic acid.

According to a twelfth aspect of the invention, a shaped material for fibers, comprising a copolymer of hydroxycinnamic acid and lithocholic acid or polyhydroxycinnamic acid.

According to a thirteenth aspect of the invention, a shaped material for optical parts having an optical characteristic to be changed by light irradiation or heating, comprising a copolymer of hydroxycinnamic acid and lithocholic acid or polyhydroxycinnamic acid.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

A bio-liquid crystal polymer in the first preferred embodiment according to the invention will be explained below.

The bio-liquid crystal polymer is composed of a copolymer of hydroxycinnamic acid as a bio-resource and lithocholic acid as other bio-resource. It is represented by general structural formula (1) described below.

An example of method of making the bio-liquid crystal polymer in the first embodiment will be explained below.

Into a four-neck flask, hydroxycinnamic acid, e.g., 4-hydroxycinnamic acid (which is represented by general structural formula (2) described later, herein referred to as "4HCA") of 0.82 g (5 mmol) and lithocholic acid (which is represented by general formula (3) described later, herein referred to as "LCA") of 1.9 g (10 mmol) are entered. Then, acetic anhydride (10 ml) having a catalytic activity and a transesterification catalyst, e.g., sodium acetate are added. Then, the four-neck flask is purged with dry-nitrogen and entered into a silicone oil bath. The four-neck flask is heated in the silicone oil bath to react at 200° C. for 6 hours while being covered with a light shielding sheet, e.g., aluminum foil.

After the reaction, the product is taken out, dissolved in pentafluorophenol, poured slowly in ethanol for re-precipitating. The precipitate is filtered and then extracted in methanol for 36 hours by Soxhlet extractor to remove impurities. The copolymer of hydroxycinnamic acid and lithocholic acid thus obtained is vacuum-dried for 12 hours. Then, it is provided for various tests.

(2)

(3)

The bio-liquid crystal polymer in the first embodiment has properties described below.

(1) Table 1 shows the solubility of the bio-liquid crystal polymer. As seen from Table 1, at all of the LCA contents, (1)

it can be dissolved in pentafluorophenol. At LCA content of 70 mol % or more, it can be dissolved in acetonitrile, DMF, NMP, THF and chloroform.

TABLE 1

| solvent | monomer | | LCA content (mol %) | | | | | | |
|---|---|---|---|---|---|---|---|---|---|
| | 4HCA | LCA | 0 | 20 | 50 | 60 | 70 | 80 | 100 |
| water | +a | − | − | − | − | − | − | − | − |
| methanol | + | + | − | − | − | − | − | − | + |
| ethanol | + | + | − | − | − | − | − | − | + |
| acetone | + | + | − | − | − | − | − | + | + |
| acetonitrile | + | − | − | − | − | − | + | + | + |
| pentafluorophenol | + | + | + | + | + | + | + | + | + |
| DMF | + | + | − | − | − | − | + | + | + |
| NMP | + | + | − | − | − | − | + | + | + |
| DMSO | + | + | − | − | − | − | − | − | − |
| toluene | − | + | − | − | − | − | − | + | + |
| hexane | − | − | − | − | − | − | − | − | + |
| THF | + | + | − | − | − | − | + | + | + |
| chloroform | − | − | − | − | − | − | + | + | + |

Figure 1:
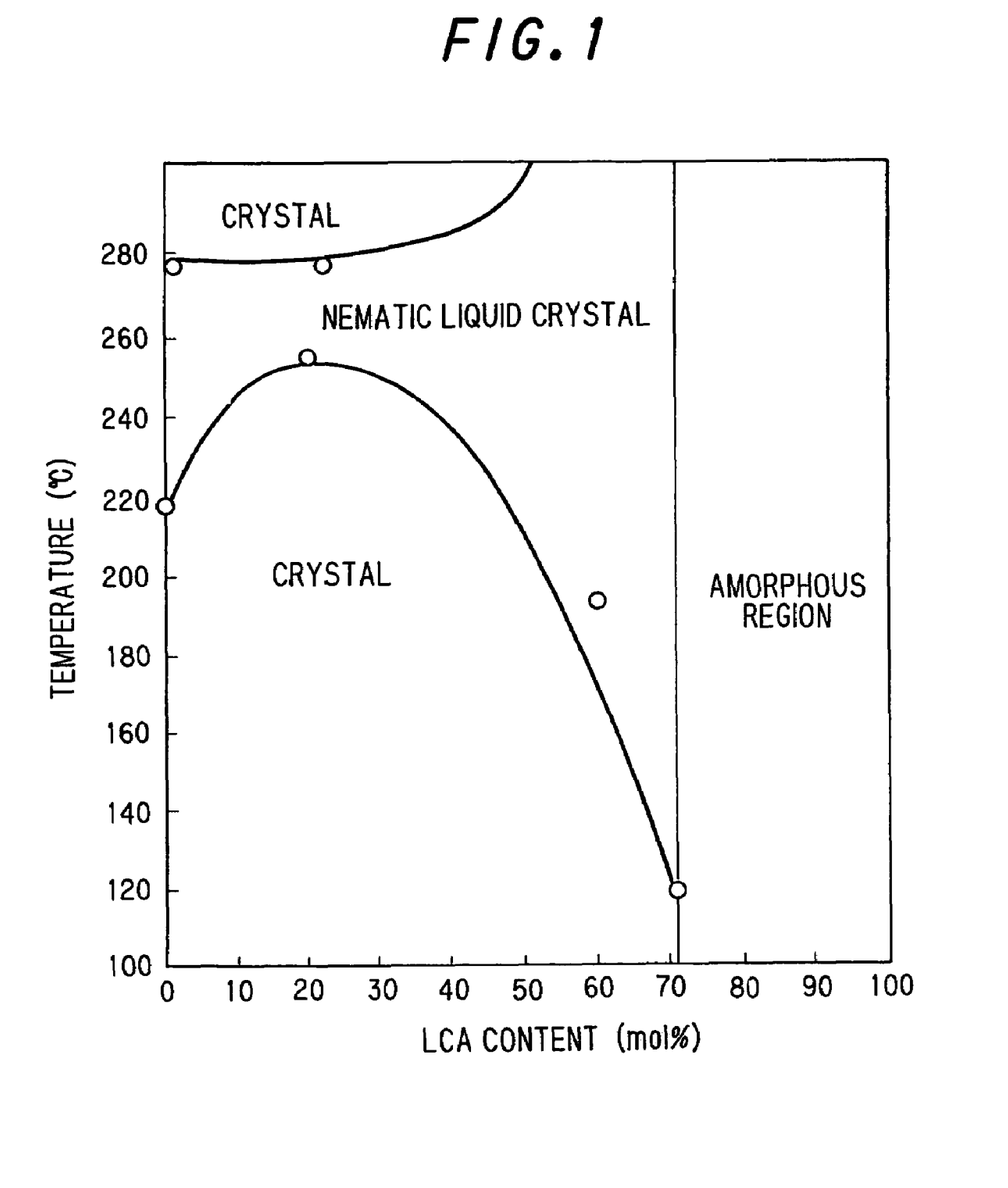
FIG. 1 is a graph showing the relationship between an LCA content and the temperature of bio-liquid crystal polymer in a first preferred embodiment according to the invention.

+a: soluble only when heated
+: dissolved
−: not dissolved (2) FIG. 1 shows the relationship between the LCA content and the temperature of bio-liquid crystal polymer in the first embodiment. As seen from FIG. 1, when a small amount of LCA (20 mol % or less) is added to 4HCA, the melting point increases. When the LCA content is 20 to 70 mol %, the melting point decreases and the region of liquid crystal widens. Further, when the LCA content is 70 mol % or more, it becomes amorphous. When LCA content is about 48% or more, the copolymer of 4HCA and LCA has, as shown in FIG. 1, the property of liquid crystal at a temperature lower than polyhydroxycinnamic acid (which is equivalent to LCA content of 0%). When a nematic liquid crystal is heated, it comes to the state of crystal again at about 280° C. or higher.

Figure 2:
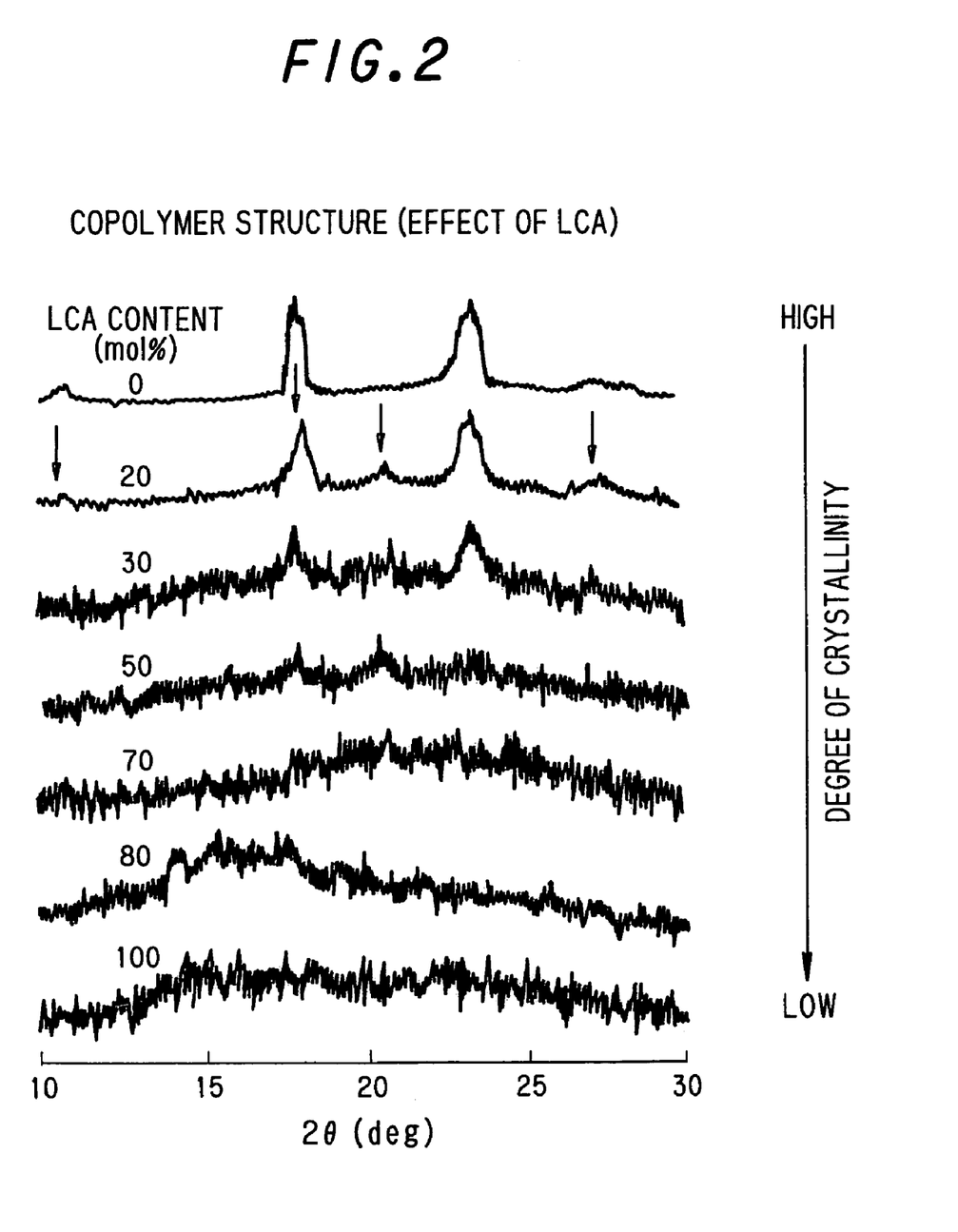
FIG. 2 is a diagram showing the crystal structure data of bio-liquid crystal polymer in the first embodiment.

(3) FIG. 2 shows the crystal structure data of bio-liquid crystal polymer in the first embodiment. As seen from FIG. 2, due to a small amount of LCA (20 mol %) added, the regularity of crystal structure increases (where the existence of peaks shown by arrows (↓) in FIG. 2 shows an increase in regularity of crystal structure). However, the peaks become broad at LCA contents of 30 mol % or more and, thus, the regularity of crystal structure lowers. On the other hand, the degree of crystallinity lowers as the LCA content increases.

Figure 3A:
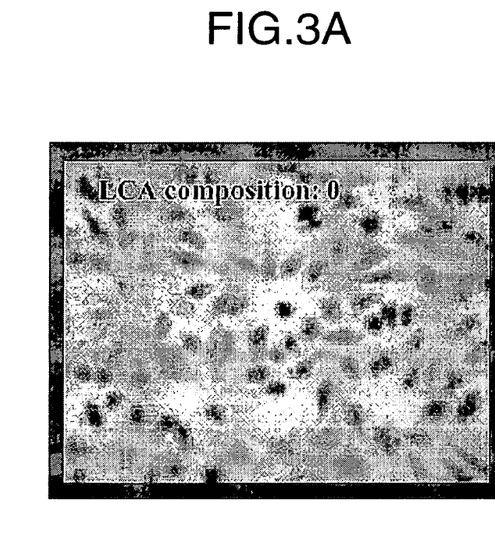
FIGS. 3A to 3C are photographs showing the cell extensibility at various LCA contents of bio-liquid crystal polymer in the first and second embodiment.
Figure 3B:
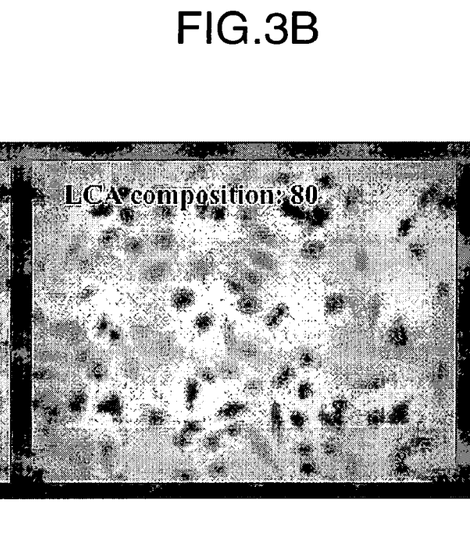
Figure 3C:
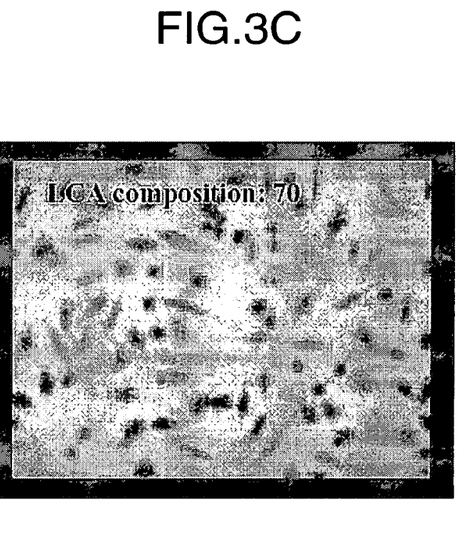

(4) FIGS. 3A to 3C shows the biocompatibility of bio-liquid crystal polymer in the first embodiment. The biocompatibility test is conducted such that L929 cells, which are used for a cytotoxicity test according to the guidelines of basic biological test for medical apparatuses and materials issued by the Health, Labour and Welfare Ministry, are sprayed over a cast film composed of polyhydroxycinnamic acid and LCA. As a result, as shown in FIG. 3A to 3C, a good cell extensibility is obtained at LCA contents of 0 to 80%.

Meanwhile, although the biocompatibility is difficult to define unambiguously, it could be defined such that it means a property to coexist with a living body for a long period while not affecting badly, giving no stimulus and providing a proper function.

In further detail, the biocompatibility mainly includes a blood compatibility that matters under conditions where it directly contacts blood and a histocompatibility that matters under conditions where it does not frequently contact blood except for the level of capillary blood vessel. In the blood compatibility, the important property is that, when a material contacts blood, the blood components are not sticked nor clotted. On the other hand, although the histocompatibility can be applied to wide levels of organs and therefore its contents are broad, it means, briefly, a property to keep a suitable contact with a cell or organ while keeping the immune function and cell or organ function in a normal state and, if necessary, recovering or enforcing those functions. Thus, in the histocompatibility, the important properties are that there is no biochemical rejection such as cell adhesion, cell reproduction and cell activation and no toxicity reaction (acute, chronic).

The cell extensibility means that when a cell reproduces on a medium, i.e., when it starts reproducing in contact with the medium, the cell adheres to the surface of medium and the pseudopod is extended from the cell to grasp the surface of medium, then starting the reproduction, whereby the cell is extended. The existence of extensibility on the surface of medium means that there exists a biocompatibility on the surface of medium.

From the abovementioned viewpoints, the bio-liquid crystal polymer in the first embodiment has the next advantages.

(i) As shown in FIG. 1, it has a phase of nematic liquid crystal and, thus, it has a high mechanical strength (tensile strength of 1 GPa or more) and a high elasticity (10 GPa or more). Furthermore, it has a high melting point and, therefore, it can be applied to electronic and electrical parts, such as connectors, that require a thermal resistance (about 100° C. or higher).

(ii) It has a good cell extensibility on and, thus, it has a biocompatibility. Therefore, it can be applied to medical parts such as cell incubation dish, surgical suture thread, bone fixation screw, artificial blood vessel and living tissue regeneration foothold (e.g., artificial nose).

In stead of 4HCA and LCA described above, tissue-derived compounds, which have two or more reactive functional groups and are capable of polymerizing, or the derivates can be combined to give the other suitable bio-liquid crystal polymer. Namely, the tissue-derived compounds include compounds with reactive functional groups such as ester group, thioester group, amide group, thioamide group, ketone group, thioketone group, carbonate group, thiocarbonate group, urethane group, thiourethane group, imide group, thioimide group, isoimide group, ether group, thioether group, amine group, azomethine group, azo group, hydroxamic acid, acid anhydride, oxazole group, isooxazole group, thiazole group, imidazole group, oxadiazole group, triazole group, triazine group, imidazolon group, hydantoin group, pyrazole group, oxazinone group, quinazolone group, quinazolinedione group, quinoxaline group and phthalazinone group.

Furthermore, the bio-liquid crystal polymer can be i) a copolymer of a) any one of aromatic series natural products, which have two or more reactive functional groups and are capable of polymerizing, and b) one or more selected from nucleic acids, amino acids, saccharides, fatty acids, terpenes, porphyrins, flavonoids, steroids and alkaloids, which have two or more reactive functional groups and are capable of polymerizing, or ii) a copolymer of two or more selected from nucleic acids, amino acids, saccharides, fatty acids, terpenes, porphyrins, flavonoids, steroids and alkaloids, which have two or more reactive functional groups and are capable of polymerizing and have a rigid structural unit such as alicyclic, double bond and triple bond.

A bio-liquid crystal polymer in the second preferred embodiment according to the invention will be explained below.

The bio-liquid crystal polymer is composed of a homopolymer of an aromatic series natural product, as a starting material, which have two or more reactive functional groups and are capable of polymerizing. For example, a homopolmer (polyhydroxycinnamic acid) of hydroxycinnamic acids will be explained below. It is represented by general structural formula (4) described below.

(4)

An example of method of making the bio-liquid crystal polymer in the second embodiment will be explained below.

Into a four-neck flask, hydroxycinnamic acid, e.g., 4-hydroxycinnamic acid (which is represented by general structural formula (2) described earlier, herein referred to as "4HCA") of 0.82 g (5 mmol) is entered. Then, acetic anhydride (10 ml) having a catalytic activity and a transesterification catalyst, e.g., sodium acetate are added. Then, the four-neck flask is purged with dry-nitrogen and entered into a silicone oil bath. The four-neck flask is heated in the silicone oil bath to react at 200° C. for 6 hours while being covered with a light shielding sheet, e.g., aluminum foil.

After the reaction, the product is taken out, dissolved in pentafluorophenol, poured slowly in ethanol for re-precipitating. The precipitate is filtered and then extracted in methanol for 36 hours by Soxhlet extractor to remove impurities. The homopolymer of hydroxycinnamic acid thus obtained is vacuum-dried for 12 hours. Then, it is provided for various tests.

The bio-liquid crystal polymer in the second embodiment has properties described below.

(1) As shown in Table 1 described earlier, at LCA content of 0 mol % (i.e., polyhydroxycinnamic acid), it can be dissolved in pentafluorophenol.

(2) As shown in FIG. 1, at LCA content of 0 mol % (i.e., polyhydroxycinnamic acid), it can be liquidized at 220° C. or higher while having the birefringence and its schlieren structure proper to the nematic liquid crystal can be observed by using orthogonal polarizer. When heated to 280° C., it becomes crystal. Thus, the polyhydroxycinnamic acid has multiple crystal types from crystal through liquid crystal to crystal as it is heated. The melting point is 220° C.

Figure 4A:
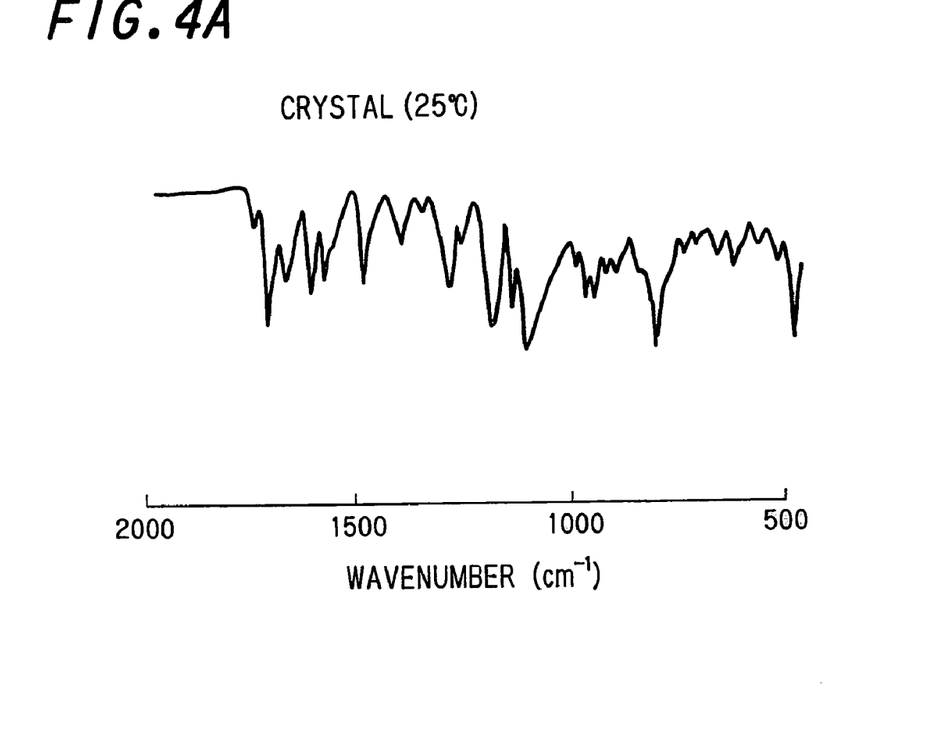
FIG. 4A is a graph showing the result of infrared absorption spectroscopy before and after a UV irradiation to polyhydroxycinnamic acid in the second embodiment at 25° C.
Figure 4B:
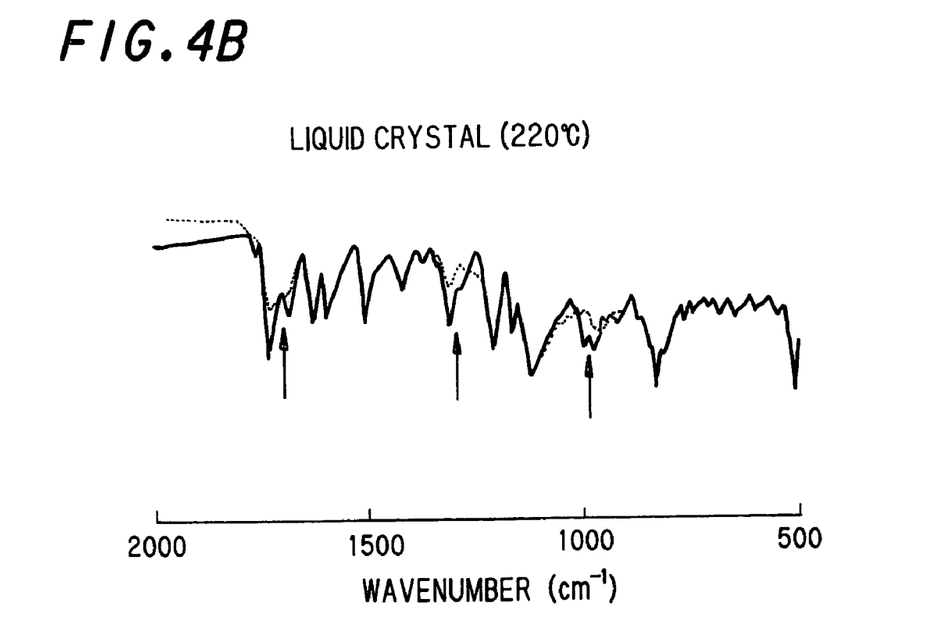
FIG. 4B is a graph showing the result of infrared absorption spectroscopy before and after a UV irradiation to polyhydroxycinnamic acid in the second embodiment at 220° C.

(3) FIGS. 4A and 4B show the photoreactivity of polyhydroxycinnamic acid by UV irradiation (wavelength of 280 to 400 nm) at different temperatures. FIG. 4A shows the result of infrared absorption spectroscopy before and after the UV irradiation to polyhydroxycinnamic acid at 25° C. On the other hand, FIG. 4B shows the result of infrared absorption spectroscopy before and after the UV irradiation to polyhydroxycinnamic acid at 220° C. In FIGS. 4A and 4B, solid lines indicate the spectra of infrared absorption before the UV irradiation, dotted lines indicate the spectra of infrared absorption after the UV irradiation, the horizontal axis indicates wavenumber (cm$^{-1}$) and the vertical axis indicates absorbance. As shown in FIG. 4A, there is no spectrum difference between before and after the UV irradiation at 25° C. and, therefore, it is proved that the photoreaction does not occur. As shown in FIG. 4B, there are spectrum differences between before and after the UV irradiation at 220° C., i.e., there are differences in absorbance therebetween at wavelengths of 1700, 1283 and 997 cm$^{-1}$ which are shown by arrows in FIG. 4B and the absorbance at which is related to double bonds in the polymer and, therefore, it is proved that the photoreaction occurs.

Figure 5A:
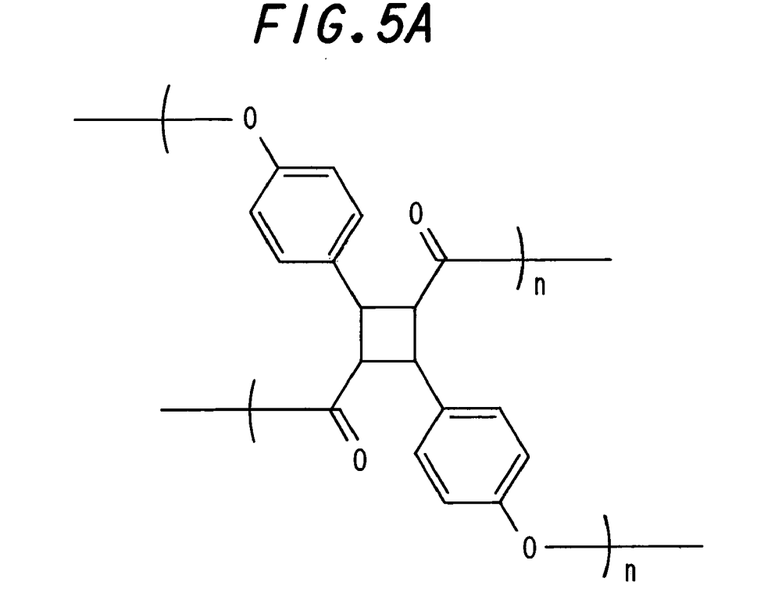
FIG. 5A is a general structure formula showing a product derived from polyhydroxycinnamic acid to be produced by photoreaction of UV irradiation in the state of liquid crystal at 220° C.

FIG. 5A shows the cyclobutane group that seems to be produced between the molecular chains of the polyhydroxycinnamic acid by photoreaction of UV irradiation (wavelength of 280 to 400 nm) in the state of liquid crystal at 220° C.

Figure 5B:
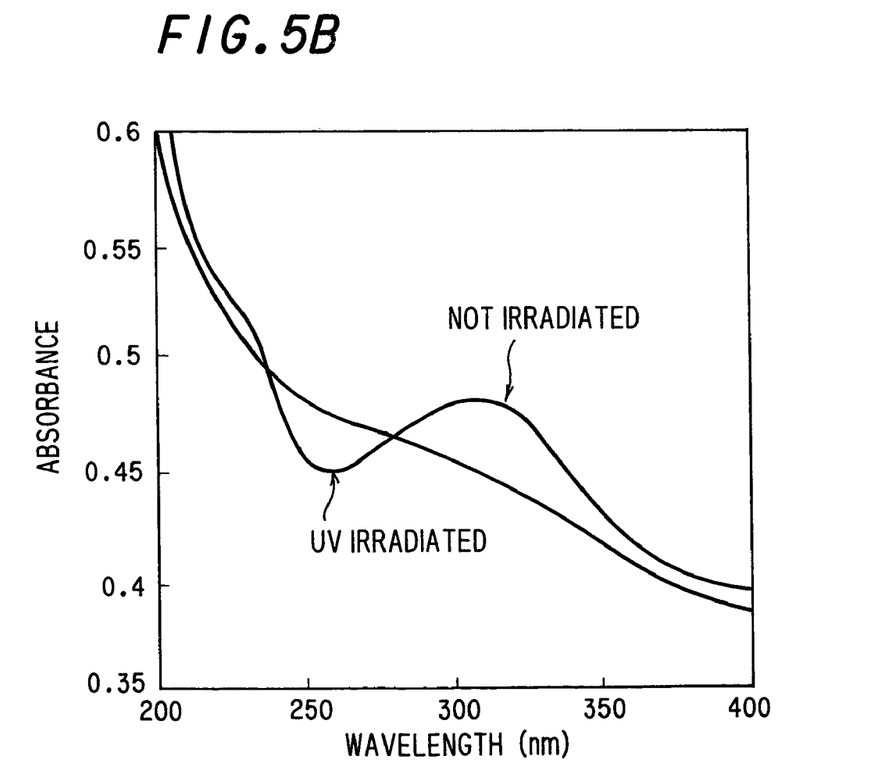
FIG. 5B is a graph showing the result of ultraviolet absorption spectroscopy before and after a UV irradiation to polyhydroxycinnamic acid at 220° C.

FIG. 5B shows the result of ultraviolet absorption spectroscopy before and after the UV irradiation (wavelength of 280 to 400 nm) to polyhydroxycinnamic acid at 220° C. As shown in FIG. 5B, a peak of about 310 nm disappears when UV is irradiated at 220° C. This proves that the photoreaction by the UV irradiation occurs such that the polymer includes the cyclobutane group, since a peak of 310 nm is based on double bonds in straight chain of polyhydroxycinnamic acid. The cyclobutane group is also produced when the UV irradiation is conducted in the state of being recrystallized at 280° C. and in the state of being back to room temperature (25° C.) after the recrystallization at 280° C. However, the products thus produced are different from that produced when the UV radiation is conducted in the state of being liquidized at 220° C.

(4) As shown in FIG. 3A, when the L929 cells are sprayed over a cast film composed of polyhydroxycinnamic acid (i.e., LCA content is 0%), a good cell extensibility is obtained.

(5) In measuring the mechanical strength of polyhydroxycinnamic acid, an elasticity of 45.7 GPa and a hardness of 0.92 GPa are obtained. Comparing with this, fused silica has an elasticity of 70 GPa and a hardness of 10 GPa. Also, commodity polymers have an elasticity of about 2 to 4 GPa and a hardness of about 0.1 to 0.3 GPa. Thus, polyhydroxycinnamic acid has a mechanical strength significantly higher than the commodity polymers.

The elasticity and hardness of bio-liquid crystal polymer in the invention is measured by using nanoindentation method. This method is frequently used, for surface mechanical properties of thin film, fragile material and surface modification film. The details of nanoindentation method, which is a kind of Vickers hardness test, are as follows. In this method, an indenter is indented to the surface of sample to a depth of nano levels and monitored to get a load-displacement curve. By analyzing the curve thus obtained, the hardness and elastic constant of sample surface can be determined.

In this invention, polyhydroxycinnamic acid of the second embodiment is dissolved in solvent, pentafluorophenol, thereby giving a solution of polyhydroxycinnamic acid, then coating this solution on a glass substrate by coating by spin coating to make thin film. Thus, a sample for nanoindentation is prepared. AFM controller is SPI3800, SII Co. Ltd. and nanoindentaion module is TriboScope, Hysitron Co. Ltd. At room temperature, diamond indenter (triangular pyramid, apex angle of 142.3°) is indented to the surface of sample while applying a maximum load of 50 μN by using linear load applying. Nine samples are tested and seven samples thereof are averaged while removing two samples with minimum and maximum values.

Figure 12:
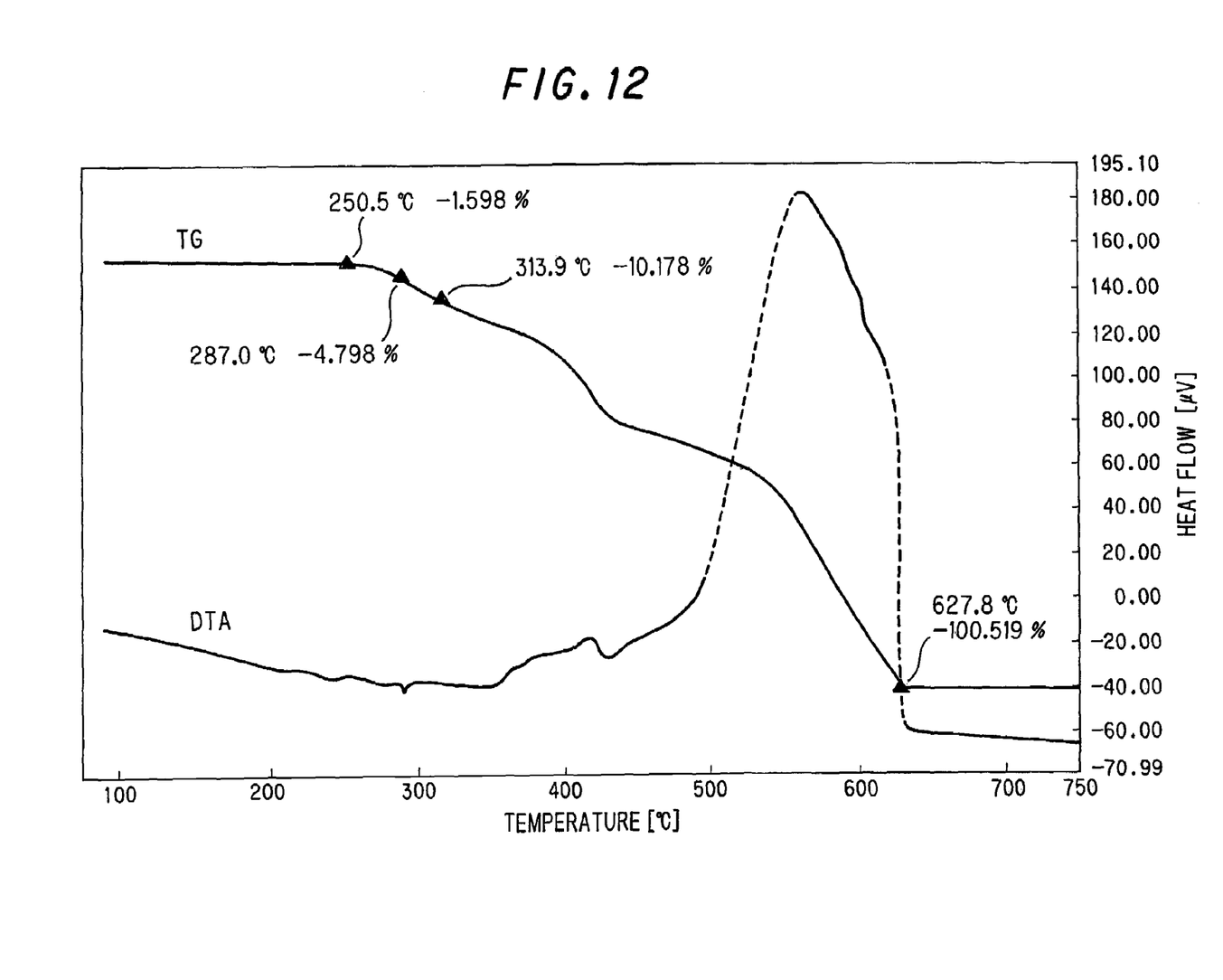
FIG. 12 is a graph showing the result of thermogravimetry (TG) and differential thermal analysis (DTA) of polyhydroxycinnamic acid in the second embodiment.

(6) FIG. 12 shows the result of thermogravimetry (TG) and differential thermal analysis (DTA) of polyhydroxycinnamic acid. As shown in FIG. 12, there is a phase transition at about 250° C. or higher. This proves that it has a high thermal resistance.

From the abovementioned viewpoints, the bio-liquid crystal polymer in the second embodiment has the next advantages.

(i) As shown in FIG. 1, it has a phase of nematic liquid crystal and, thus, it has a high mechanical strength and a high elasticity. Furthermore, it has a high melting point and, therefore, it can be applied to electronic and electrical parts, such as connectors, that require a thermal resistance.

(ii) The cyclobutane group is produced between the molecular chains by the UV irradiation and, therefore, the difference in refractive index between polyhydroxycinnamic acid and the product including the cyclobutane group can be applied to optical devices such as a recording medium.

(iii) It has a good cell extensibility on and, thus, it has a biocompatibility. Therefore, it can be applied to medical parts such as cell incubation dish, surgical suture thread, bone fixation screw, artificial blood vessel and living tissue regeneration foothold (e.g., artificial nose).

In stead of 4HCA described above, a tissue-derived compound, which has two or more reactive functional groups and is capable of polymerizing, or the derivates can be used to give the other suitable bio-liquid crystal polymer. Namely, the tissue-derived compound include a compound with reactive functional groups such as ester group, thioester group, amide group, thioamide group, ketone group, thioketone group, carbonate group, thiocarbonate group, urethane group, thiourethane group, imide group, thioimide group, isoimide group, ether group, thioether group, amine group, azomethine group, azo group, hydroxamine group, acid anhydride, oxazole group, isooxazole group, thiazole group, imidazole group, oxadiazole group, triazole group, triazine group, imidazolon group, hydantoin group, pyrazole group, oxazinon group, quinazolone group, quinazolinedione group, quinoxaline group and phthaladinone group.

Furthermore, the bio-liquid crystal polymer can be i) a homopolymer of a) an aromatic series natural product, which has two or more reactive functional groups and are capable of polymerizing, or ii) a homopolymer of one selected from nucleic acids, amino acids, saccharides, fatty acids, terpenes, porphyrins, flavonoids, steroids and alkaloids, which have two or more reactive functional groups and are capable of polymerizing, or iii) a homopolymer of one selected from nucleic acids, amino acids, saccharides, fatty acids, terpenes, porphyrins, flavonoids, steroids and alkaloids, which have two or more reactive functional groups and are capable of polymerizing and have a rigid structural unit such as alicyclic, double bond and triple bond.

Figure 6A:
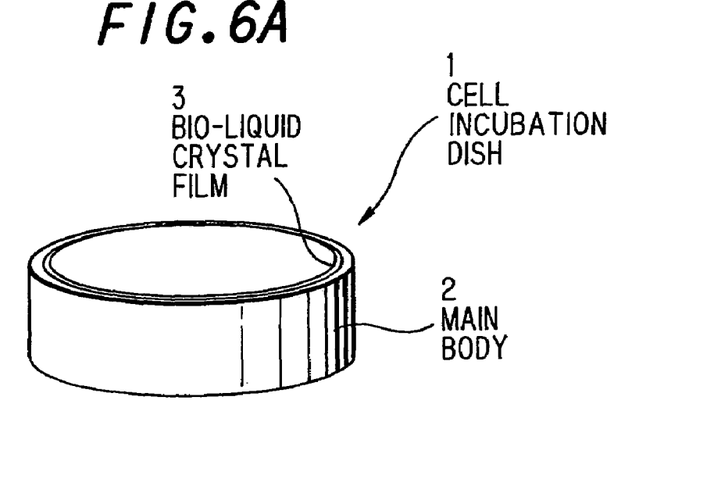
FIG. 6A is a perspective view showing a cell incubation dish in a third preferred embodiment according to the invention.
Figure 6B:
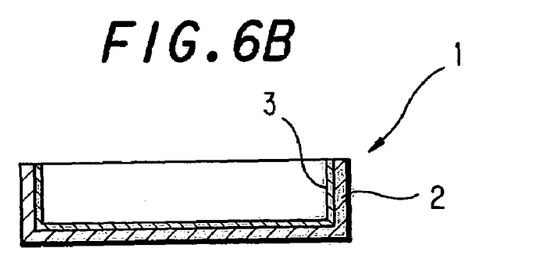
FIG. 6B is a cross sectional view showing the cell incubation dish in FIG. 6A.

FIGS. 6A and 6B show a cell incubation dish in the third preferred embodiment according to the invention. The cell incubation dish 1 is composed of a main body 2 of a dish shape with the top opened, and a film 3 that is of bio-liquid crystal polymer in the first or second embodiment and is formed on the inner surface of the main body 2. The cell incubation dish 1 is used as a biocompatible incubation apparatus. The bio-liquid crystal polymer film 3 is easy to form on the surface of an existing apparatus.

Figure 7:
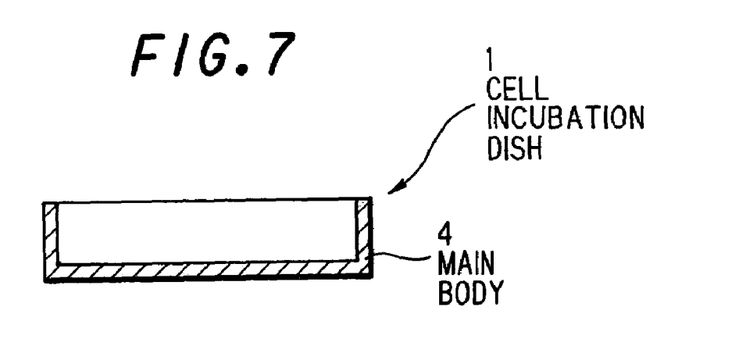
FIG. 7 is a cross sectional view showing a modification of the cell incubation dish in FIG. 6A.

FIG. 7 shows a modification of the cell incubation dish in the third embodiment. The modified cell incubation dish 1 has a main body 4 that is of only bio-liquid crystal polymer in the first or second embodiment, and it is provided without forming the film 3 as shown in FIGS. 6A and 6B.

Figure 8:
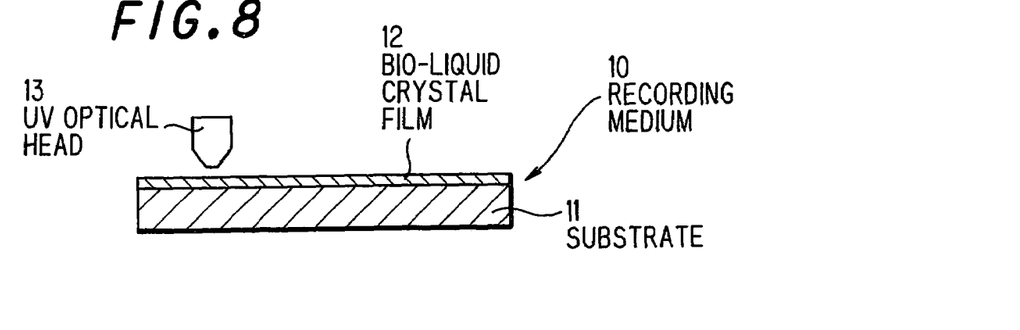
FIG. 8 is a cross sectional view showing a recording medium in a fourth preferred embodiment according to the invention.

FIG. 8 shows a recording medium in the fourth preferred embodiment according to the invention. The recording medium 10 is composed of a substrate 11 and a bio-liquid crystal polymer film 12 that is of bio-liquid crystal polymer in the first or second embodiment and is formed on the surface of the substrate 11. In operation, ultraviolet light emitted from a UV optical head 13 is converged on the bio-liquid crystal polymer film 12 while heating the film 12 at 220° C. such that the refractive index of the bio-liquid crystal polymer film 12 is changed. Thus, information is written on the surface of the recording medium 10. Instead of the UV optical head 13, a thermal head may be used. In this case, the thermal head is heated at 280° C. such that the refractive index of the film 12 is changed.

Figure 9:
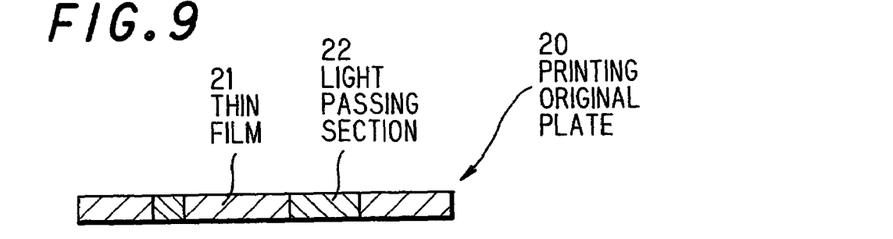
FIG. 9 is a cross sectional view showing a printing original plate in a fifth preferred embodiment according to the invention.

FIG. 9 shows a printing original plate in the fifth preferred embodiment according to the invention. The printing original plate 20 is composed of a thin film 21 of bio-liquid crystal polymer. In the thin film 21, there is provided a light passing section 22 the refractive index of which is changed by UV irradiation or heating like the fourth embodiment.

Figure 10:
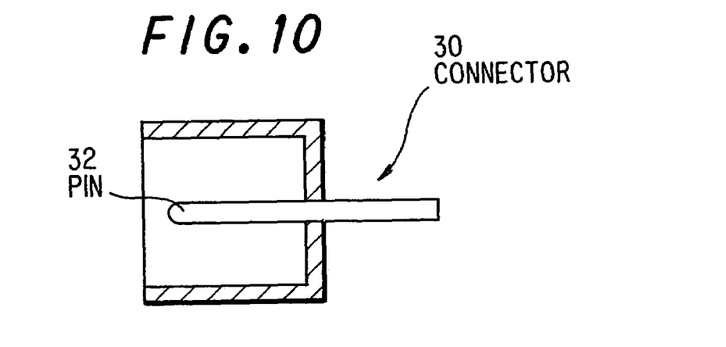
FIG. 10 is a cross sectional view showing a connector as electronic or electrical parts in a sixth preferred embodiment according to the invention.

FIG. 10 shows a connector as electronic or electrical parts in the sixth preferred embodiment according to the invention. The connector 30 is composed of a pin 32 and a cover 31 that covers the pin 32. The cover 31 is made of bio-liquid crystal polymer in the first or second embodiment and, thus, has a high mechanical strength and a thermal resistance.

Figure 11:
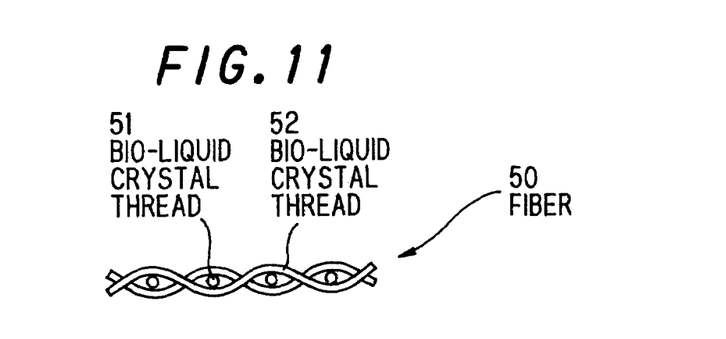
FIG. 11 is a cross sectional view showing a cloth for flak jacket in a seventh preferred embodiment according to the invention.

FIG. 11 is a cross sectional view showing a cloth for flak jacket in the seventh preferred embodiment according to the invention. The cloth 50 for flask jacket is woven with threads 51 and 52 that are of bio-liquid crystal polymer in the first or second embodiment.

The bio-liquid crystal polymer of the invention can be applied to products in various technical fields other than those in the abovementioned third to sixth embodiments.

For example, in the field of automobile parts, it can be applied to interior parts such as pillar garnish, glove box and switch panel, exterior parts such as rear garnish, side molding, and door mirror stay, parts around engine such as cylinder head cover, intake manifold and radiator.

In the field of electrical and electronic parts, it can be applied to VTR deck mechanical parts, PC housing, keyboard stem, toner cartridge, electric refrigerator (door handle, inner box), room air conditioner (housing, grill, damper), electric washing machine (control panel), electric vacuum cleaner (housing, inlet duct), electronic oven, humidifier, housing for dish washing machine etc.

In the field of construction and housing units, sash door roller, sash door, door handle, handrail, furniture member, shower head, air conditioner duct, toilet seat, prefabricated bath member, decorative panel, toilet stand etc.

In the field of commodities, fastener, toothbrush, pen case, cushion material etc.

In the field of mechanical parts, motor fan, conveyer member etc.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A bio-liquid crystal polymer, comprising a copolymer which is produced by polymerizing a) any one of aromatic series compounds found in nature which have two or more reactive functional groups and are capable of polymerizing and b) one or more selected from nucleic acids, amino acids, saccharides, fatty acids, terpenes, porphyrins, flavonoids, steroids and alkaloids which have two or more reactive functional groups and are capable of polymerizing, wherein said copolymer comprises an aromatic ring in a main chain.

2. A bio-liquid crystal polymer, comprising a copolymer of hydroxycinnamic acid and lithocholic acid.

3. The bio-liquid crystal polymer according to claim 2, wherein:

said bio-liquid crystal polymer includes lithocholic acid up to 70 mol %.

4. The bio-liquid crystal polymer according to claim 2, wherein:

said bio-liquid crystal polymer includes lithocholic acid up to 30 mol %.

5. A shaped material for biocompatible parts, comprising a copolymer of hydroxycinnamic acid and lithocholic acid or polyhydroxycinnamic acid.

6. A shaped material for parts requiring mechanical strength and thermal resistance, comprising a copolymer of hydroxycinnamic acid and lithocholic acid or polyhydroxycinnamic acid.

7. A shaped material for fibers, comprising a copolymer of hydroxycinnamic acid and lithocholic acid or polyhydroxycinnamic acid.

8. A shaped material for optical parts having an optical characteristic to be changed by light irradiation or heating, comprising a copolymer of hydroxycinnamic acid and lithocholic acid or polyhydroxycinnamic acid.

* * * * *